United States Patent
Kitamura

(10) Patent No.: US 12,548,993 B2
(45) Date of Patent: Feb. 10, 2026

(54) ROBOT TRAVELING DEVICE AND ROBOT SYSTEM

(71) Applicant: FANUC CORPORATION, Yamanashi (JP)

(72) Inventor: Ryouji Kitamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 605 days.

(21) Appl. No.: 17/908,169

(22) PCT Filed: Mar. 4, 2021

(86) PCT No.: PCT/JP2021/008468
§ 371 (c)(1),
(2) Date: Aug. 30, 2022

(87) PCT Pub. No.: WO2021/182300
PCT Pub. Date: Sep. 16, 2021

(65) Prior Publication Data
US 2023/0121702 A1 Apr. 20, 2023

(30) Foreign Application Priority Data
Mar. 10, 2020 (JP) .................................. 2020-041363

(51) Int. Cl.
*B25J 5/02* (2006.01)
*B23Q 5/22* (2006.01)
*H02G 11/00* (2006.01)

(52) U.S. Cl.
CPC .............. *H02G 11/00* (2013.01); *B23Q 5/22* (2013.01); *B25J 5/02* (2013.01)

(58) Field of Classification Search
CPC ... H02G 11/00; B25J 5/02; B23Q 5/22; F16G 13/16
See application file for complete search history.

(56) References Cited

U.S. PATENT DOCUMENTS 4,589,184 A * 5/1986 Asano .................... B62D 65/06
29/430
4,875,823 A * 10/1989 Fuse ...................... B25J 18/002
901/29
(Continued)

FOREIGN PATENT DOCUMENTS

EP 0705665 * 2/1995 .............. B25J 19/00
JP H05-317762 A 12/1993
(Continued)

OTHER PUBLICATIONS

International Search Report issued in PCT/JP2021/008468 mailed on May 11, 2021 with English Translation (8 pages).
(Continued)

*Primary Examiner* — Ronald P Jarrett
(74) *Attorney, Agent, or Firm* — HAUPTMAN HAM, LLP

(57) ABSTRACT

A robot traveling device 20 according to one aspect of the present disclosure is arranged on a floor surface. The robot traveling device includes a plurality of bases 21 discretely laid on the floor surface, a rail base 23 installed on the bases, a rail part 27 supported by the rail base, a stand part 29 that is movably supported by the rail part and on which a robot 200 is mounted, and a flexible cable carrier 31 for protecting a cable of the robot. Heights of the bases are determined so that a gap of 50 to 100 mm is provided between the floor surface and the rail base and cable carrier. Accordingly, maintainability is improved without lowering of approachability of workers to the machine tool.

3 Claims, 18 Drawing Sheets

(56) References Cited

U.S. PATENT DOCUMENTS

2017/0341221 A1 11/2017 Hashimoto et al.
2018/0215590 A1 8/2018 Miller et al.

FOREIGN PATENT DOCUMENTS

| JP | 2005-096018 A | 4/2005 |
|----|---------------|--------|
| JP | 2009-184024 A | 8/2009 |
| JP | 2010-089228 A | 4/2010 |
| JP | 2012-000681 A | 1/2012 |
| JP | 2018-167376 A | 11/2018 |
| JP | 2019-005890 A | 1/2019 |
| JP | 2019-063930 A | 4/2019 |
| WO | 2016/103304 A1 | 6/2016 |

OTHER PUBLICATIONS

Written Opinion of International Searching Authority issued in PCT/JP2021/008468 mailed on May 11, 2021 with English Translation (7 pages).

* cited by examiner

ROBOT TRAVELING DEVICE AND ROBOT SYSTEM

FIELD

Embodiments described herein relate generally to a robot traveling device and a robot system.

BACKGROUND

For example, in a robot system for attaching and detaching a workpiece to and from a machine tool by a robot, a robot traveling shaft that causes the robot to travel is used for the purpose of conveying the workpiece. As the robot traveling shaft used for a machine tool, an overhead traveling type robot traveling shaft has been conventionally used so that workers can easily approach the machine tool.

CITATION LIST

Patent Literature

Patent Literature 1: Japanese Unexamined Patent Application Publication No. 2010-89228

SUMMARY OF INVENTION

Technical Problem

In the case where the robot traveling shaft is arranged in front of or on the side of the machine tool, when a worker approaches the machine tool, the worker's foot or toe hits the robot traveling shaft, which becomes an obstacle, resulting in poor workability (see FIG. 8). An overhead traveling type robot traveling shaft (Cited Literature 1), which is advantageous in terms of ease of approach and space saving, has been used, but it takes time and cost because assembly and maintenance are carried out at a high place. Therefore, there is a demand for a robot traveling shaft that has high maintainability but does not lower the approachability of workers to a machine tool.

Solution to Problem

A robot traveling device according to one aspect of the present disclosure is arranged on a floor surface. A robot traveling device includes a plurality of bases discretely installed on the floor surface, a rail base installed on the bases, a rail part supported by the rail base, a stand part that is movably supported by the rail part and on which a robot is mounted, and a flexible cable carrier for protecting a cable of the robot. The heights of the bases are determined so that a gap of 50 to 100 mm is provided between the floor surface and the rail base and cable carrier.

Advantageous Effects of Invention

According to this aspect, maintainability is improved without lowering of approachability of workers to the machine tool.

DETAILED DESCRIPTION

Figure 1:
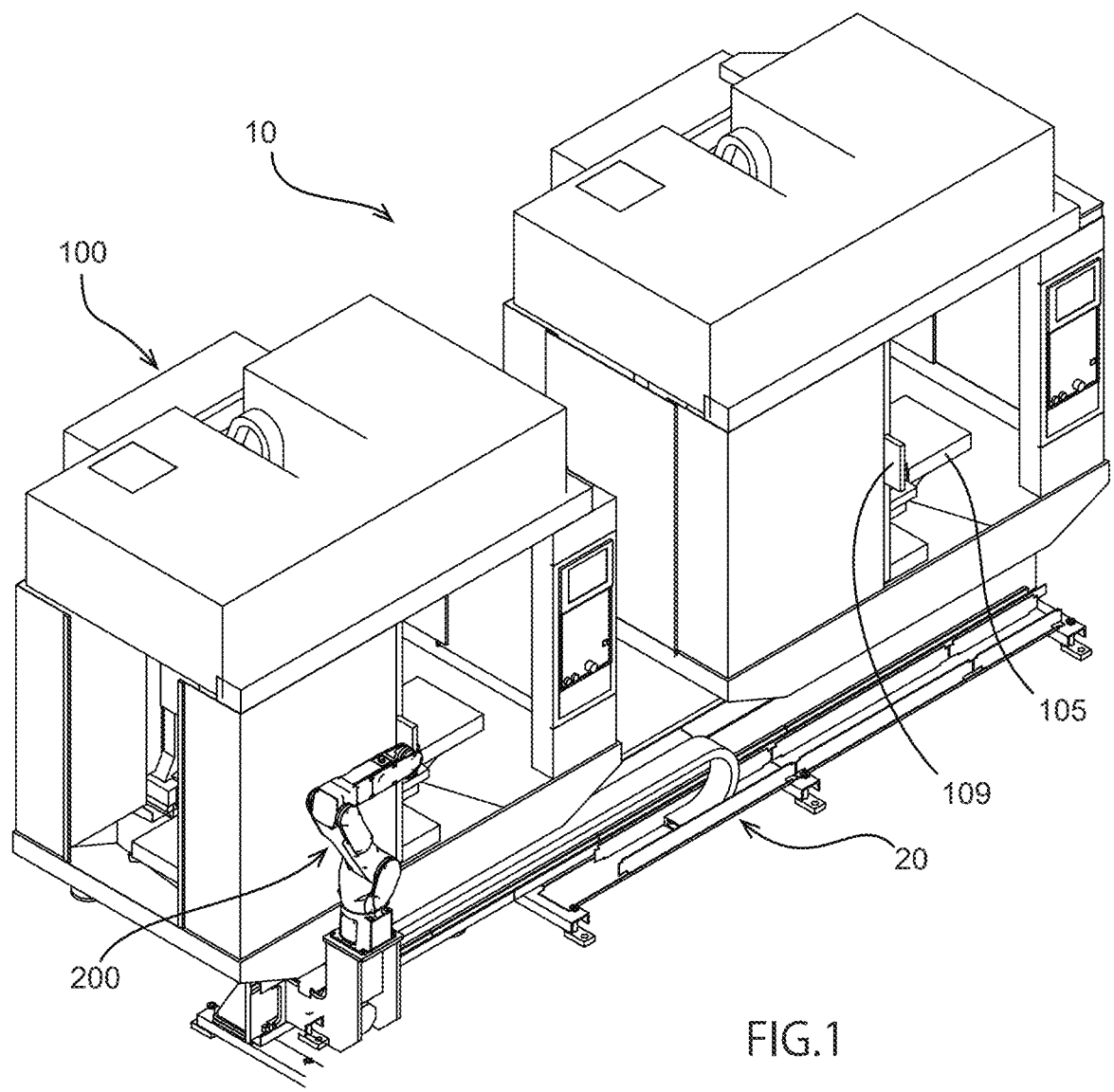
FIG. 1 is a perspective view showing a robot system including a robot traveling device according to a first embodiment.

Hereinafter, robot traveling devices according to embodiments will be described with reference to the drawings. In the following description, components having substantially the same function and configuration are denoted by the same reference numeral, and a repetitive description will be given only where necessary.

(Configuration of Robot System)

Figure 2:
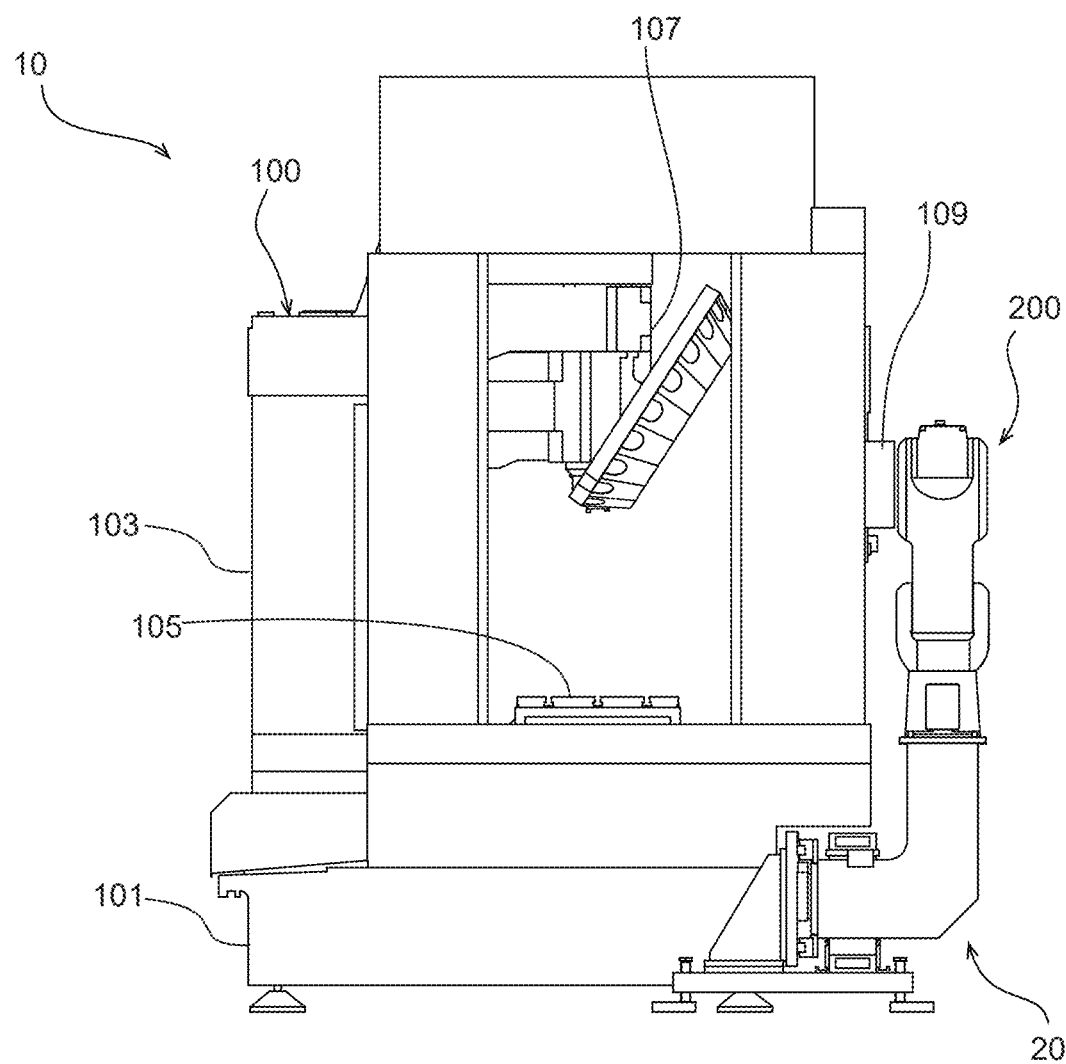
FIG. 2 is a side view of the robot system of FIG. 1.
Figure 3:
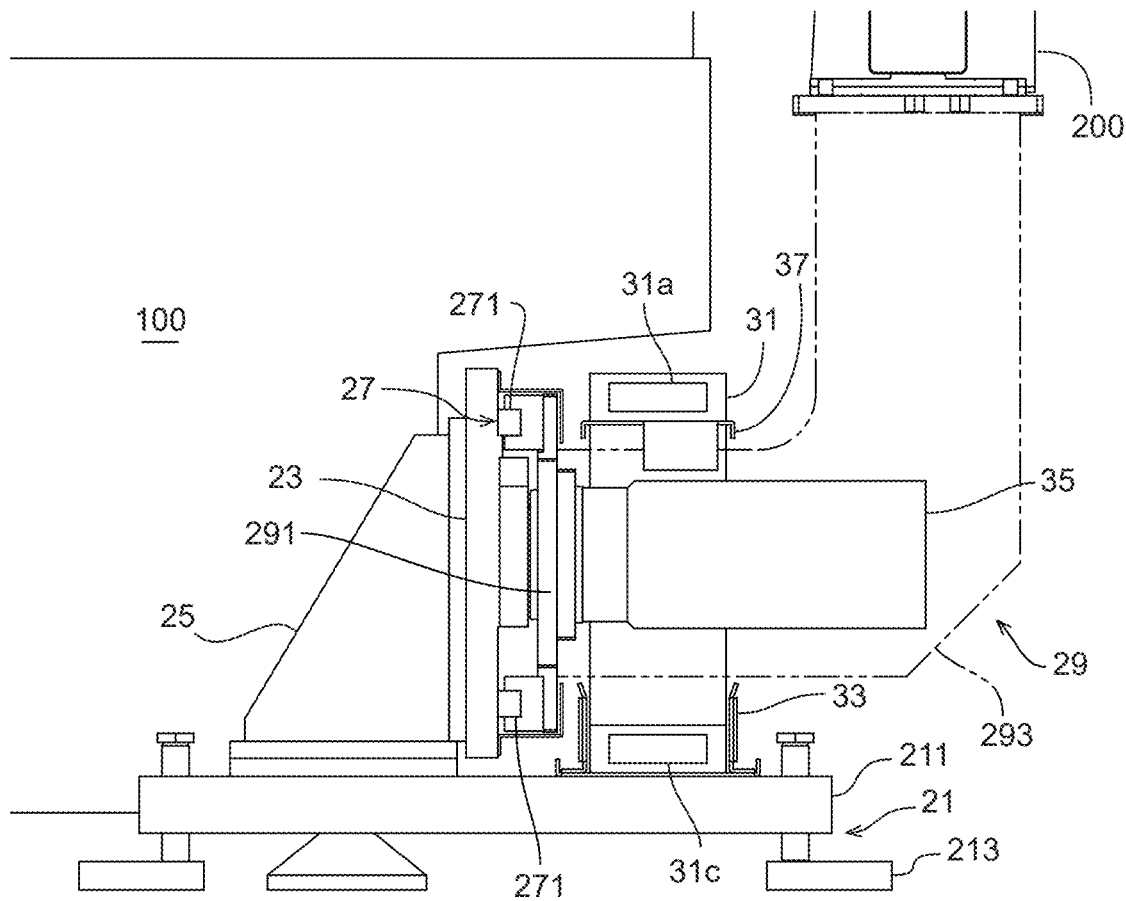
FIG. 3 is an enlarged view of a portion of the robot traveling device of FIG. 2 which is placed on the floor surface.

FIGS. 1, 2, and 3 show a robot system 10 including a robot traveling device 20 according to the first embodiment. FIG. 1 is a perspective view, FIG. 2 is a side view, and FIG. 3 is an enlarged view of a portion of the robot traveling device 20 of FIG. 2 which is placed on the floor surface. The robot system 10 includes a machine tool 100, a robot 200 that attaches and detaches a workpiece to and from the machine tool 100, and a robot traveling device 20 for causing the robot 200 to travel between a workpiece storage space and the machine tool 100.

As shown in FIGS. 1, 2, and 3, the machine tool 100 is a device, such as a forming machine or a machining center, that performs a predetermined process such as manufacturing a workpiece, which is a formed part, or joining a formed part to or machining a supplied workpiece. Typically, the machine tool 100 includes a machine tool base 101 installed on the floor surface and a machine tool body 103 mounted on the machine tool base 101. A table 105 on which a workpiece is installed and a main shaft 107 provided with a jig for holding a working tool are arranged inside the machine tool body 103. A slide door 109 for accessing the inside of the machine tool body 103 is provided on the front surface of the machine tool body 103. The slide door 109 is also used by a worker to access the inside of the machine tool 100 during maintenance work or the like.

A space is formed between the machine tool body 103 and the floor surface. Here, the front surface of the machine tool body 103 provided with the slide door 109 projects outward with respect to the front surface of the machine tool base 101. That is, a linear space (depression) extending in the left-right direction is formed in a lower portion of the front surface of the machine tool 100.

The robot traveling device 20 according to the first embodiment is configured to be installed in the depression in the lower portion of the front surface of the machine tool 100 to allow the robot 200 to travel at a position close to the slide door 109 on the front surface of the machine tool 100.

First Embodiment

Figure 4:
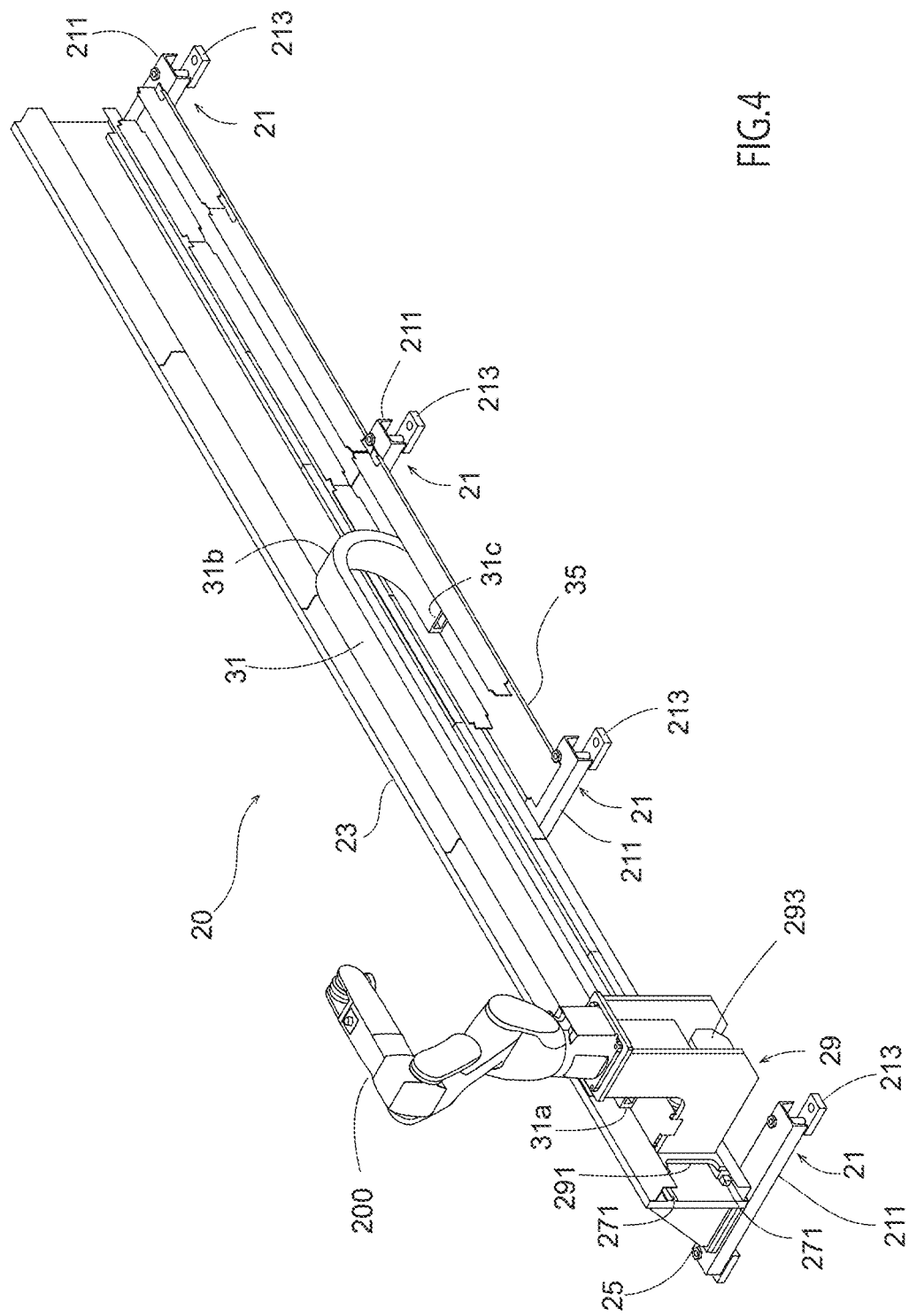
FIG. 4 is a front perspective view of the robot traveling device according to the first embodiment.
Figure 5:
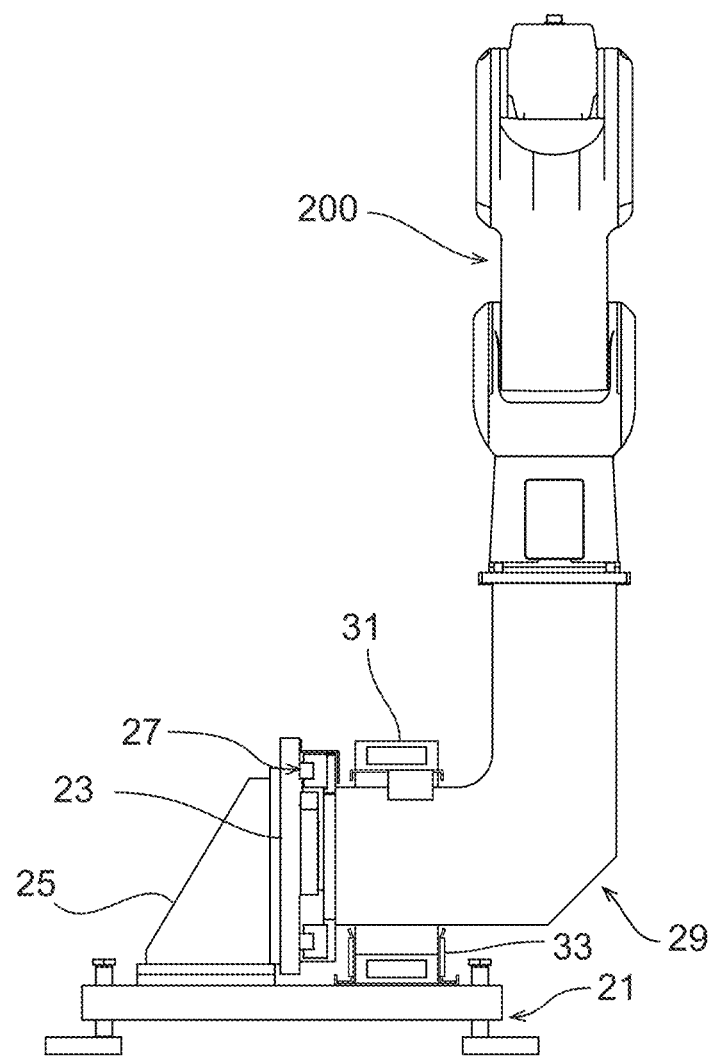
FIG. 5 is a side view showing the robot traveling device of FIG. 4.
Figure 6:
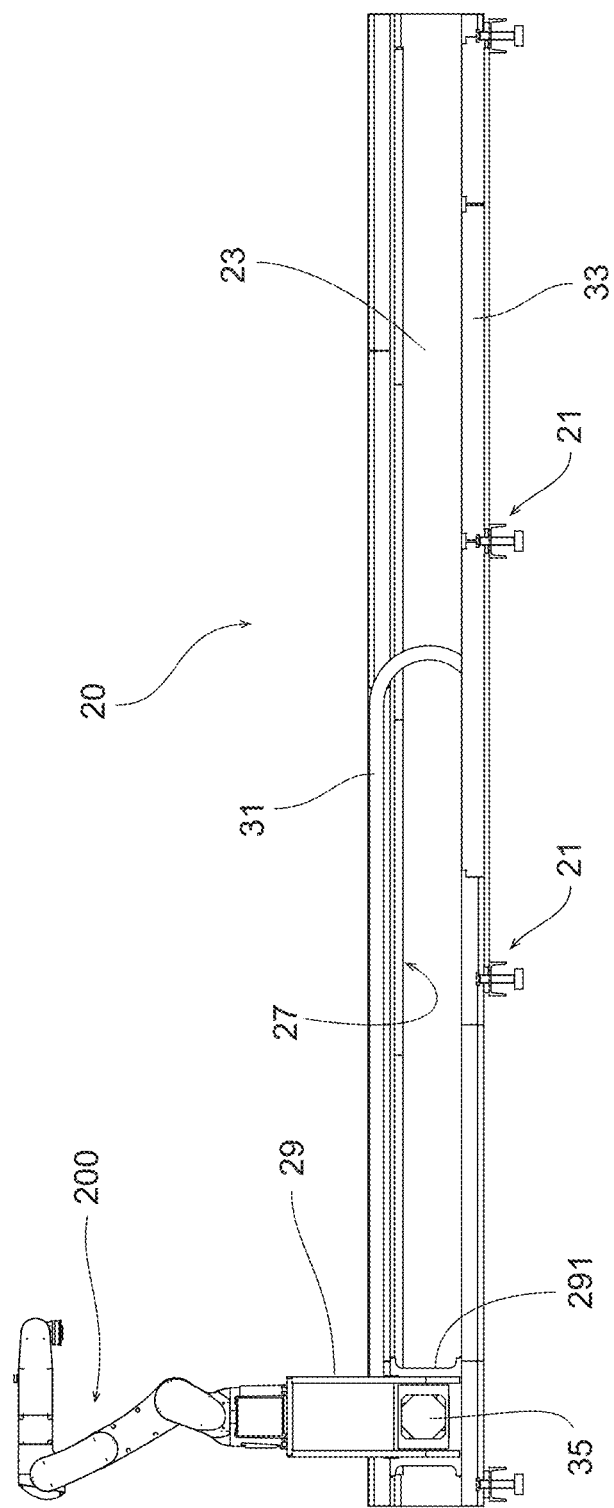
FIG. 6 is a front view showing the robot traveling device of FIG. 4.
Figure 7:
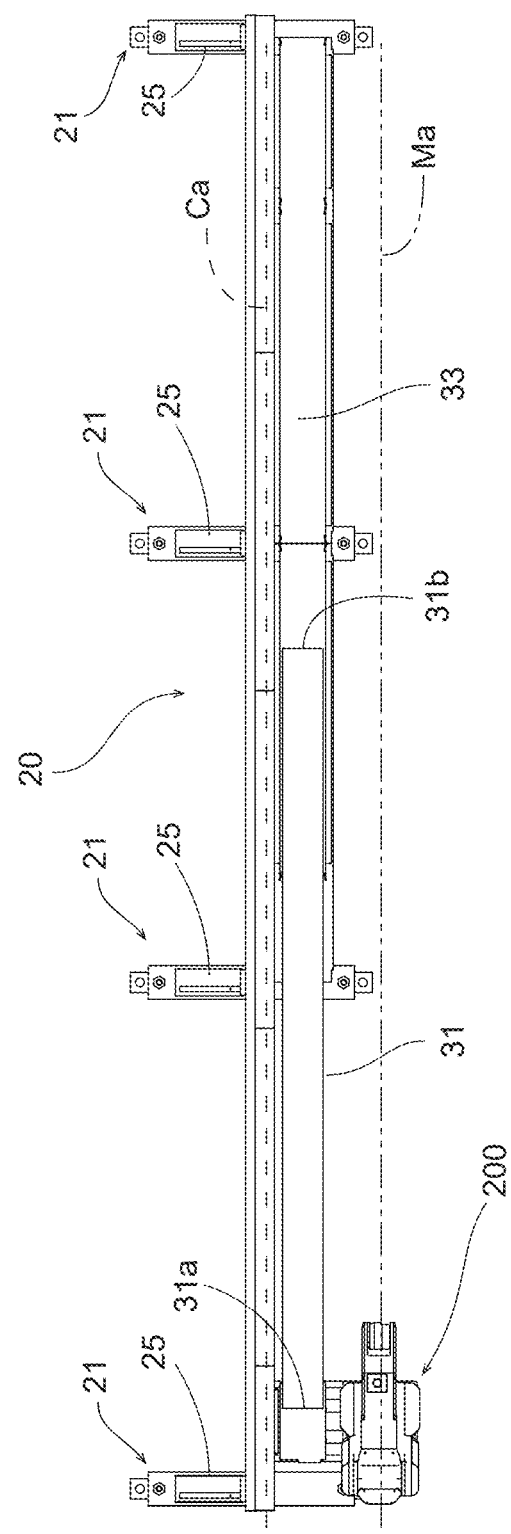
FIG. 7 is a plan view showing the robot traveling device of FIG. 4.

FIGS. 4, 5, 6, and 7 show the robot traveling device 20 according to the first embodiment. FIG. 4 is a perspective view, FIG. 5 is a side view, FIG. 6 is a front view, and FIG. 7 is a plan view.

The robot traveling device 20 includes a plurality of bases 21. The bases 21 each include a base plate 211 and a plurality of legs 213 that support the base plate 211 in such a manner as to enable the base plate 211 to move up and down with respect to the floor surface. By adjusting the heights of the legs 213, the height of each base 21 (the distance from the bottom surfaces of the legs 213 (floor surface) to the top surface of the base plate 211) can be adjusted. The bases 21 are discretely arranged along a direction parallel to the moving axis of the robot 200. A rectangular long plate-shaped rail base 23 is installed on the bases 21.

One feature of the robot traveling device 20 according to the first embodiment is that toes of a worker (toes of safety shoes worn by a worker) can be inserted between the floor surface and the rail base 23 and cable carrier 31 to be described later. To achieve this, the rail base 23 is not placed directly on the floor surface, but is supported by the bases 21 discretely arranged. The heights of the bases 21 are determined so that the toes of safety shoes can enter between the floor surface and the rail base 23 and cable carrier 31. For example, the heights of the bases 21 are preferably set to 50 to 100 mm, typically 70 mm, which is a height that allows only the toes of safety shoes to be inserted. In factories where the robot traveling device 20 is installed, it is recommended that safety shoes be worn from the viewpoint of safety. Materials, etc. of safety shoes are determined by the Japanese Industrial Standards (JIS) or the like, and safety shoes of the same size are configured to have almost the same outer shape. In addition, the workers are never children, and the size of the workers' safety shoes does not differ greatly. Therefore, by determining the heights of the bases 21 as described above, the toes of a worker wearing safety shoes can almost certainly be inserted.

Since the toes of the safety shoes can be inserted between the floor surface and the rail base 23, the worker can approach the machine tool 100 even if the robot traveling device 20 is arranged adjacent to the machine tool 100. This can suppress the lowering of the workability of maintenance work by the worker due to the installation of the robot traveling device 20 adjacent to the machine tool 100.

By setting the height between the floor surface and the rail base 23 so that only the toes of safety shoes can be inserted therebetween, but not up to the ankles of safety shoes, the worker cannot excessively approach the other components constituting the robot traveling device 20, such as the cable carrier 31 and the rail part 27, which can prevent the worker from being injured or soiled or from damaging the components by the worker coming into contact with the components. Also, the safety of the worker can be secured by preventing the worker from excessively approaching the machine tool 100. Further, since only the toes can be inserted, the risk of the worker falling is reduced, and the lowering of the operability of spur-of-the-moment movement of the worker is suppressed in comparison with the case where the ankles can be inserted, thereby improving the safety.

As shown in FIG. 5, the rail base 23 is attached to the base plate 211 of the base 21 at right angles by a right-angled triangular attachment 25. The rail part 27 is supported by the rail base 23. Typically, the rail part 27 is composed of a pair of rails 271. The pair of rails 271 are arranged parallel to each other along a direction perpendicular to the floor surface with respect to the rail base 23.

By placing the rail base 23 vertically with respect to the floor surface, a tool such as a screwdriver can be inserted vertically with respect to the rail base 23 from the front surface of the machine tool 100. As a result, even if the robot traveling device 20 is installed in a place where the height is limited, such as the lower portion of the front surface of the machine tool 100, the rail part 27 can be replaced without pulling the machine tool 100 forward from the lower portion of the front surface. This improves the workability of maintenance work by the worker. Also, by placing the rail base 23 vertically, dust such as chips and swarf is less likely to enter the rail part 27 than when the rail base 23 is placed horizontally, so that the possibility of occurrence of a failure of the robot traveling device 20 such as a traveling error can be reduced. Further, by placing the rail base 23 vertically, the installation height may be increased, but the installation width can be narrowed, so that the robot traveling device 20 can be installed in a place where the height is high but the depth is narrow.

A stand 29 is movably supported by the rail part 27. The robot 200 is mounted on the stand 29. The type of the robot 200 used here is not particularly limited. Types of robot 200 such as a vertical articulated robot and a scalar robot may be used.

The stand 29 includes a slider part 291 and a stand body 293. The slider part 291 is a quadrangular flat plate member and is slidably attached to the rail part 27. The stand body 293 has an outer shape having a substantially L-shaped vertical cross section. Specifically, the stand body 293 is configured as a substantially L-shaped groove-shaped body having an open outer surface. The stand body 293 has a connection surface with the slider part 291 at one end and a mounting surface on which the robot 200 is mounted at the other end. The stand body 293 is attached to the slider part 291 in such a manner that the proximal portion is parallel to the floor surface, the distal portion is perpendicular to the floor surface, and the robot mounting surface faces upward.

The following effects are achieved by making the outer shape of the stand 29 substantially L-shaped.

That is, the L-shaped stand 29 functions as a relay component connecting a position where the robot traveling device 20 is to be installed and a position where the robot 200 is to travel. For example, as shown in FIG. 7, the L-shaped stand 29 can offset a travel axis Ma, along which the robot 200 actually travels, in the horizontal and vertical directions with respect to a central axis Ca of the rail part 27. As a result, as shown in FIGS. 1 and 2, even if there is an installation request in which the robot traveling device 20 is to be installed in the lower portion of the front surface of the machine tool 100 and the robot 200 is to travel to a position in front of the slide door 109 on the front surface of the machine tool 100, the L-shaped stand 29 can be used to respond to the request. By using the L-shaped stand 29, as shown in FIG. 7, the travel axis of the robot 200 can be offset in the horizontal direction with respect to the rail central axis Ca, so that the robot 200 does not move directly above the rail part 27, whereby, it is possible to reduce the possibility that chips dropping from a workpiece held by the robot 200 and liquid, such as water, dripping therefrom adhere to the rail part 27, and it is possible to reduce the risk of occurrence of a failure such as dust accumulated on the rail part 27 being entangled with the slider part 291 and causing the robot 200 to stop traveling.

In the robot traveling device 20, not all of the components are stacked above the bases 21, but the stand 29 laterally extends out from slightly above the bases 21. Therefore, the height of the robot traveling device 20 can be reduced. For example, in the first embodiment, the height from the floor surface to the upper edge of the rail base 23 is kept to 500 mm or less. This allows installation in a narrow-height place such as the lower portion of the front surface of the machine tool 100. Since the base 21, the rail base 23, the rail part 27, and the cable carrier 31, other than the stand 29, constituting the robot traveling device 20 are concentrated in the space in the lower portion of the front surface of the machine tool 100, it is also possible to reduce the possibility that dust, such as chips from the machine tool 100, and liquid adhere to these components.

Since the stand 29 is a relay component connecting a position where the robot traveling device 20 is to be installed and a position where the robot 200 is to travel, its outer shape is not limited to an L-shape. For example, the outer shape of the stand 29 may be a shape curved in an arc shape or a shape bent multiple times in a staircase shape. If there is an obstacle between the position where the robot traveling device 20 is to be installed and the position where the robot 200 is to travel, the stand 29 can have various shapes to avoid the obstacle.

Inside the stand body 293, a motor unit 35 including a motor that generates a driving force for driving the movement of the slider part 291 and a reduction gear that reduces the rotation of the motor, a control device (not shown) that controls the motor, and the like are assembled. Since the outer surface of the stand body 293 is open, the worker can easily access these devices. This contributes to improvement in the workability of maintenance work by the worker.

Cables and the like connected to the control device mounted inside the stand 29 are routed by the cable carrier 31. The cable carrier 31 consists of a plurality of hollow frames pivotally coupled to each other. The cables pass through this hollow portion and are protected. The cable carrier 31 has a total length longer than the total length of the rail part 27, and is arranged to be folded back in a U-shape in the middle to vertically straddle the proximal portion of the stand body 293 which is parallel to the floor surface. One end portion 31a of the cable carrier 31 is fixed to the stand body 293 via a bracket 37. The end portion 31a of the cable carrier 31 is fixed at a position close to the rail part 27 on the upper surface of the proximal portion of the stand body 293 which is parallel to the floor surface. The other end portion 31c of the cable carrier 31 is fixed to a support plate 33 laterally laid across the upper surfaces of the bases 21. The other end portion 31c of the cable carrier 31 is fixed at a position near the length center of the robot traveling device 20 (rail part). The support plate 33 prevents a cable carrier portion of the cable carrier 31 from the end portion 31c to the bent portion 31b from hanging downward. Of course, the end portion 31c of the cable carrier 31 may be fixed directly or indirectly via a bracket to the upper surface of a base 21 near the center of the plurality of bases 21.

Cables extending from an external system control device and an external power supply device are inserted into the cable carrier 31 from the end portion 31c of the cable carrier 31 fixed near the length center of the robot traveling device 20, pass through the cable carrier 31, and are drawn to the outside from the end portion 31a of the cable carrier 31 fixed to the stand 29. The cables routed to the stand 29 by the cable carrier 31 are connected to the robot 200 mounted on the stand 29 and the control device mounted inside the stand 29.

Since the cables can be routed while being protected by the cable carrier 31, even when the stand 29 moves, the cables can avoid being damaged due to interference with another member or being entangled with each other, and the robot traveling device 20 and the robot 200 can be stably operated.

By arranging the cable carrier 31 between the robot 200 and the rail part 27, it is possible to reduce the possibility that dust such as chips from a workpiece held by the robot 200 adheres to the rail part. Also, when the robot traveling device 20 is installed on the floor surface below the projecting portion of the machine tool 100, the rail part 27 can be arranged further back, so that the above possibility can be further reduced, and the possibility that liquid such as water used in the machine tool 100 adheres to the rail part 27, the cable carrier 31, and the like can be reduced. Further, since the cable carrier 31 is arranged on the front surface side of the rail base 23, the worker can easily access the cable carrier 31 with the robot traveling device 20 installed in the lower portion of the front surface of the machine tool. Since the cable is one of the components that require frequent maintenance, the workability of maintenance is improved by arranging the cable carrier 31 as described above.

In the above-described robot traveling device 20 according to the first embodiment, a gap that allows the toes of safety shoes to enter therein is formed between the floor surface and the rail base 23. Accordingly, the worker can approach the slide door 109 of the machine tool 100 in comparison with the case where no gap is formed. In addition, by using the L-shaped stand 29, the installation height of the robot traveling device 20 can be reduced, and the position where the rail part 27 is installed can be offset in the horizontal direction and the vertical direction with respect to the position where the robot 200 travels. Accordingly, the robot traveling device 20 can be installed in a narrow space in the lower portion of the front surface of the machine tool 100, and the robot 200 can travel at a position close to the slide door 109 projecting on the front surface of the machine tool 100. Since the main components of the robot traveling device 20 are concentrated in the lower portion of the front surface of the machine tool 100, and only the stand 29 projects on the front surface of the machine tool 100, the worker can approach the slide door 109 of the machine tool 100 by retracting the stand 29 from the front of the machine tool 100.

Figure 8:
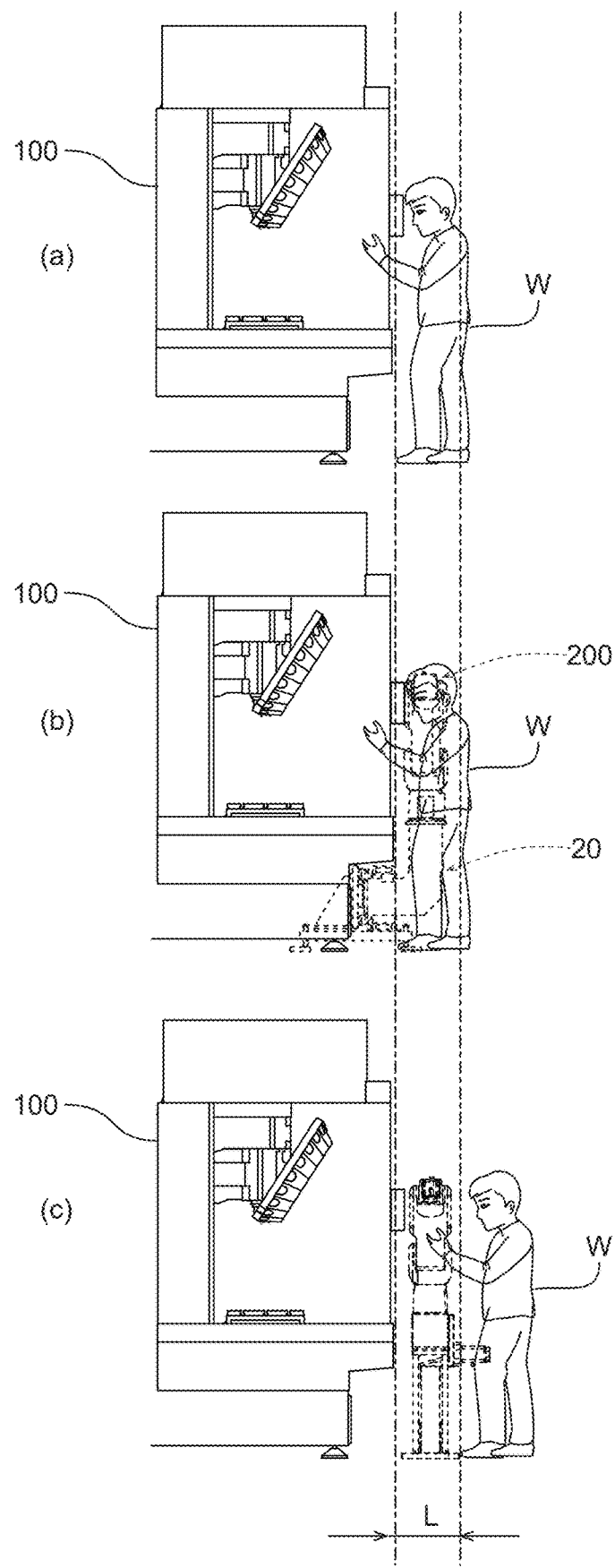
FIG. 8 is a plan illustrating effects of the robot traveling device of FIG. 4.

As described above, the two structural features "providing a gap that allows toes to enter therein between the floor surface and the rail base 23" and "providing the L-shaped stand 29" enable the robot traveling device 20 according to the first embodiment to be installed in a narrow space in the lower portion of the front surface of the machine tool 100, as shown in FIG. 8, and the worker W can approach the machine tool 100 in the same manner as when the robot traveling device 20 is not installed (see FIGS. 8(a) and 8(b)). This makes it possible to approach the machine tool 100 by a distance L equivalent to the width of a conventional robot traveling device in comparison with the case where the conventional robot traveling device is installed (see FIG. 8(c)) and makes it possible to perform maintenance work on the machine tool 100 at a standing position substantially the same as that in the case where the robot traveling device 20 is not installed, thereby suppressing the lowing of the workability due to installation of the robot traveling device 20.

Second Embodiment

In the robot traveling device 20 according to the first embodiment, the cable carrier 31 is installed on the front surface side of the rail base 23; however, the position where the cable carrier 31 is installed is not limited to this. In a robot traveling device 40 according to the second embodiment, the cable carrier 31 arranged on the front surface side of the rail base 23 in the robot traveling device 20 according to the first embodiment is arranged on the back surface side of the rail base 23. The robot traveling device 40 according to the second embodiment will be described below with reference to FIGS. 9, 10, and 11.

Figure 9:
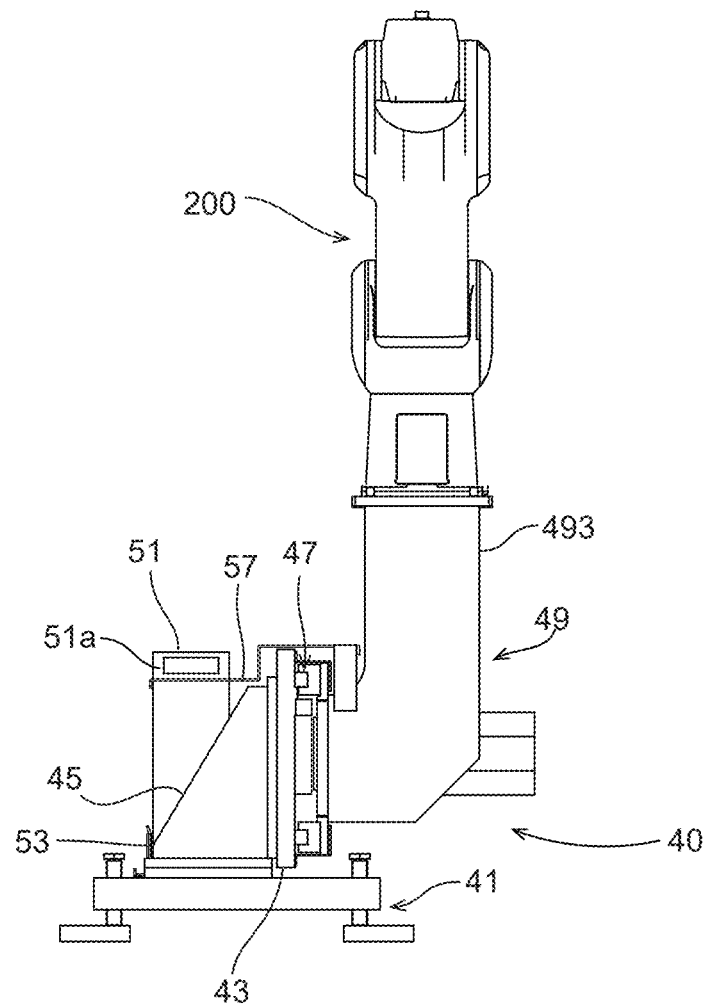
FIG. 9 is a side view showing a robot traveling device according to a second embodiment.
Figure 10:
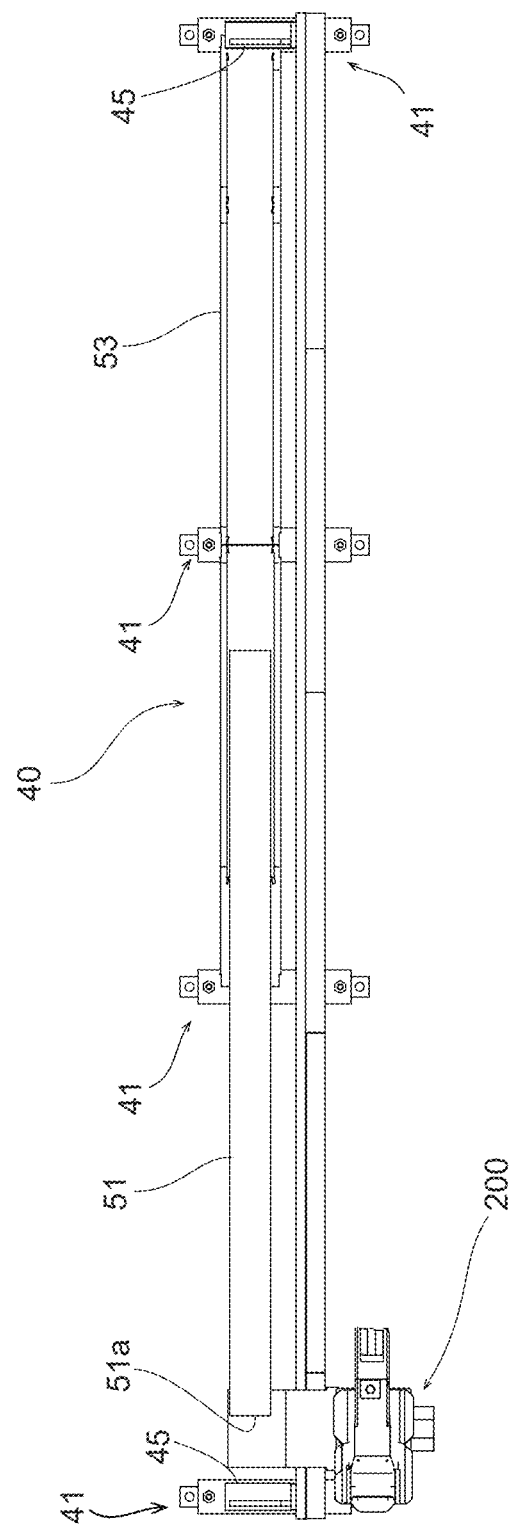
FIG. 10 is a plan view showing the robot traveling device of FIG. 9.
Figure 11:
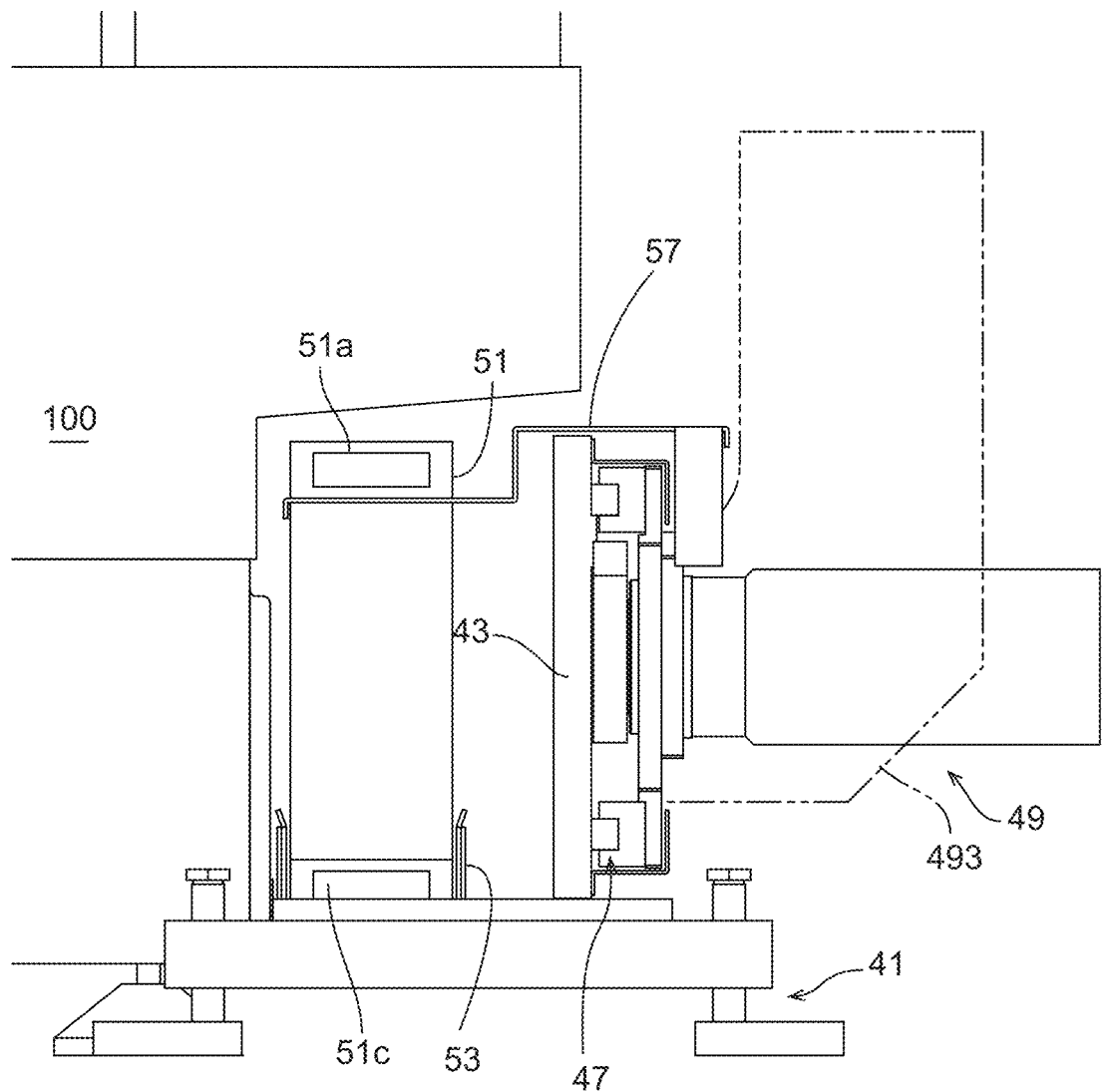
FIG. 11 is an enlarged view of a portion of the robot traveling device of FIG. 9 which is placed on the floor surface.
Figure 12:
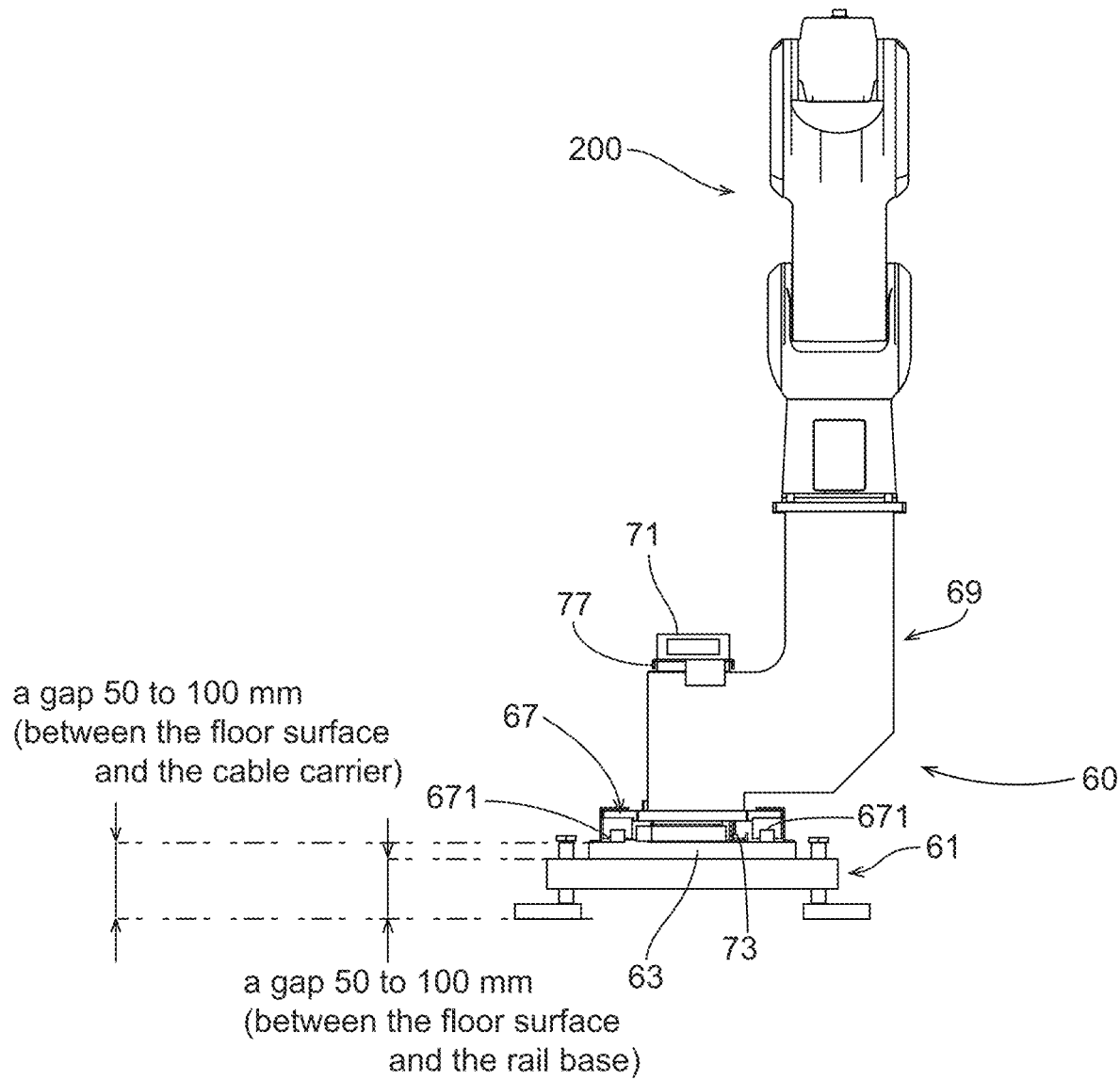
FIG. 12 is a side view showing a robot traveling device according to a third embodiment.
Figure 13:
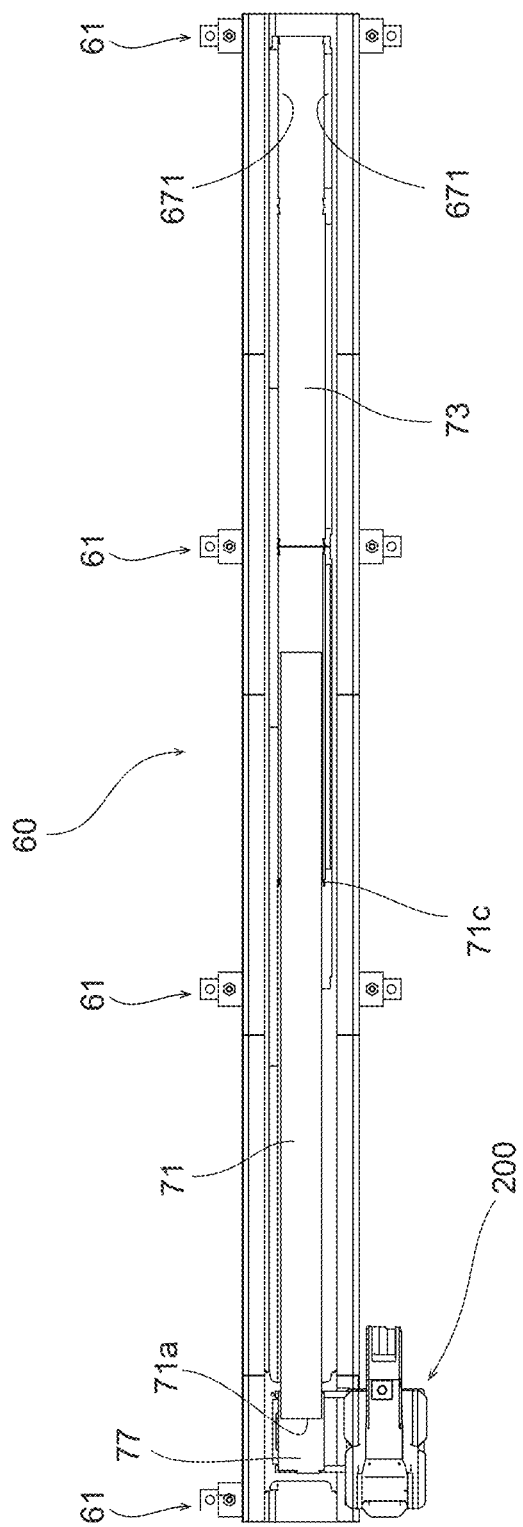
FIG. 13 is a plan view of the robot traveling device of FIG. 12.
Figure 14:
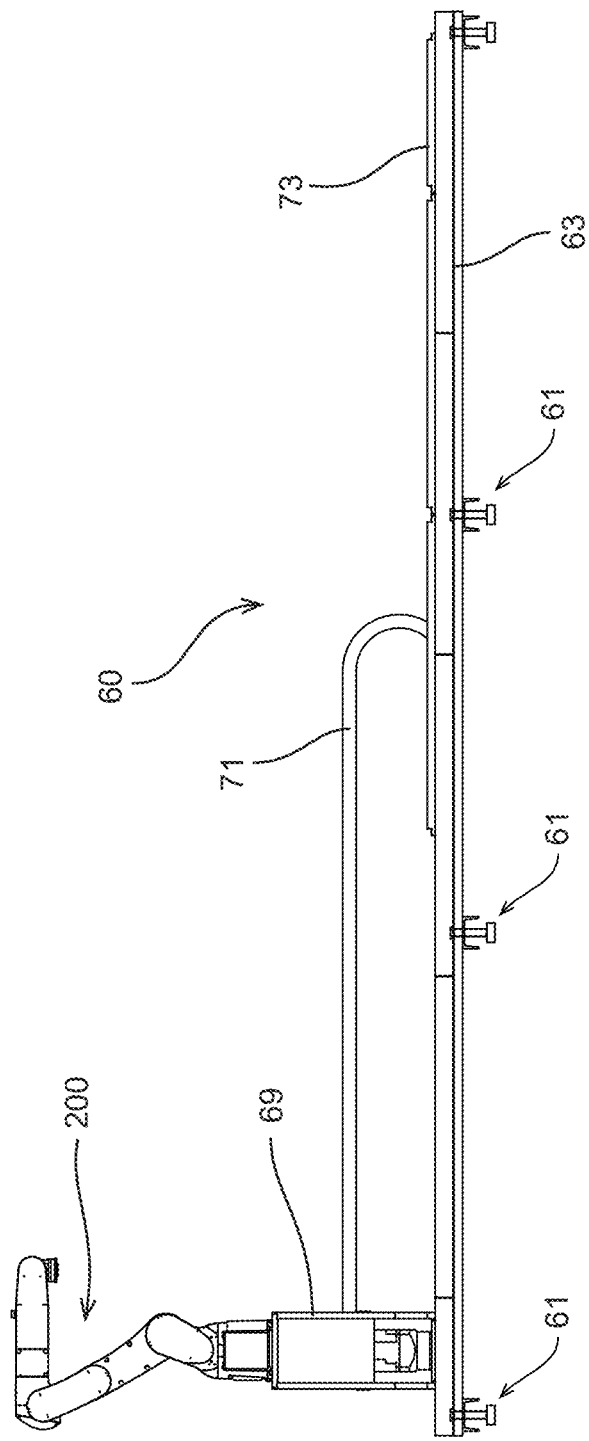
FIG. 14 is a front view of the robot traveling device of FIG. 12.
Figure 15:
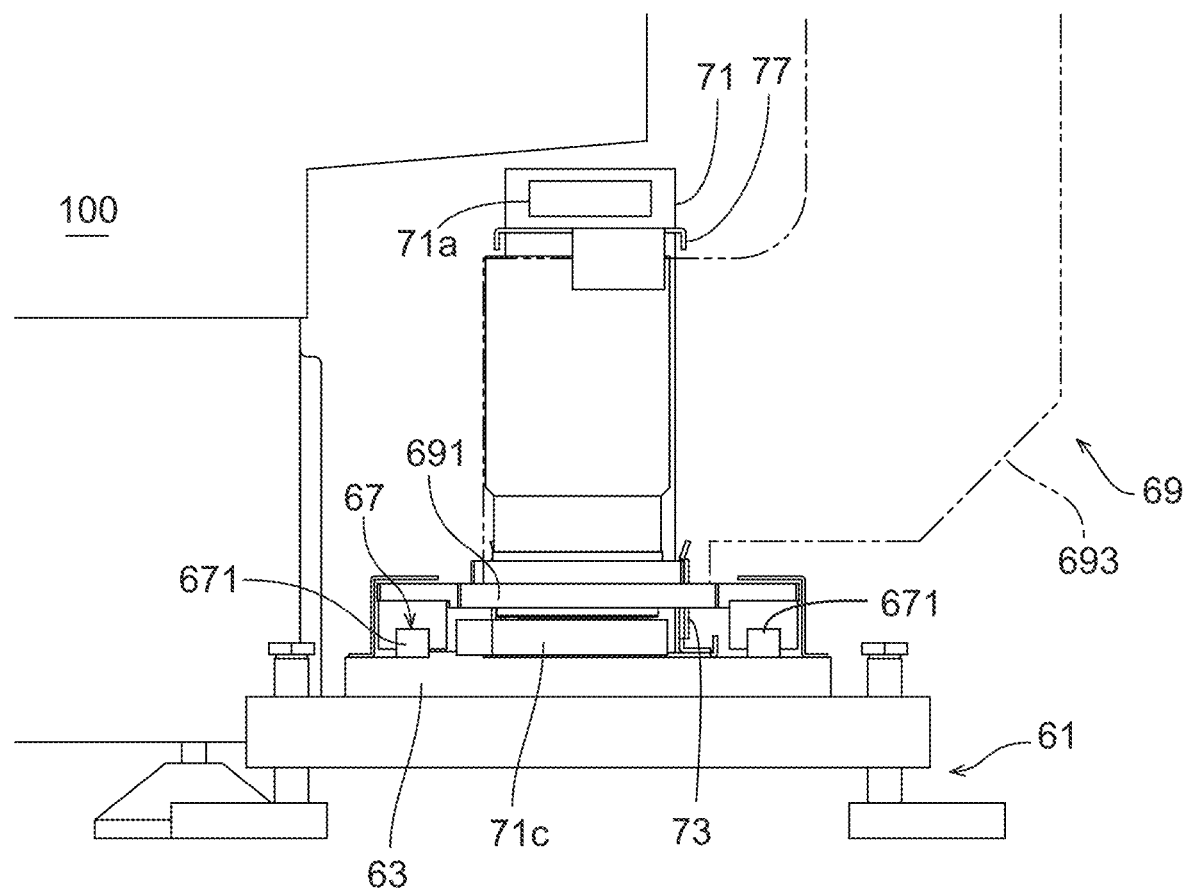
FIG. 15 is an enlarged view of a portion of the robot traveling device of FIG. 12 which is placed on the floor surface.

As shown in FIGS. 9, 10, and 11, the robot traveling device 40 includes a base 41, a rail base 43, a rail part 47, a stand 49, a cable carrier 51, and a support plate 53. The base 41, the rail base 43, the rail part 47, and the stand 49 of the robot traveling device 40 according to the second embodiment are configured in the same manner as the base 21, the rail base 23, the rail part 27, and the stand 29 of the robot traveling device 20 according to the first embodiment; therefore, the description thereof is omitted.

The cable carrier 51 is arranged on the back surface side of the rail base 23. One end portion 51a of the cable carrier 51 is fixed to the stand body 493 via a bracket. At the position where the end portion 51a of the cable carrier 51 is fixed, the height from the floor surface to the upper surface of the end portion 51a of the cable carrier 51 is equivalent to or slightly lower than the height from the floor surface to the upper end of the rail base 43. The other end portion 51c of the cable carrier 51 is fixed to a support plate 53 laterally laid across the upper surfaces of a plurality of bases 41. The other end portion 51c of the cable carrier 51 is fixed at a position near the length center of the robot traveling device 40 (rail part 47).

In the robot traveling device 40 according to the second embodiment, the cable carrier 51 is arranged on the back surface side of the rail base 43; therefore, although the workability of maintenance work on the cables is lower than that of the robot traveling device 20 according to the first embodiment in which the cable carrier 31 is arranged on the front surface side of the rail base 23, the other effects achieved by the robot traveling device 20 according to the first embodiment can be achieved.

Third Embodiment

In the robot traveling devices 20 and 40 according to the first and second embodiments, the rail bases 23 and 43 are placed vertically, but the rail bases 23 and 43 may be placed horizontally. A robot traveling device 60 according to the third embodiment is configured by placing the rail base 63 horizontally. The robot traveling device 60 according to the third embodiment will be described below with reference to FIGS. 12, 13, 14, and 15.

As shown in FIGS. 12, 13, 14, and 15, the robot traveling device 60 includes a plurality of bases 61. A rectangular long plate-shaped rail base 63 is placed horizontally on the plurality of bases 61 with respect to the floor surface. The rail part 67 is supported by the rail base 63. The rail part 67 includes a pair of rails 671. The pair of rails 671 are arranged side by side along a direction parallel to the floor surface. A stand 69 is movably supported by the rail part 67. The robot 200 is mounted on the stand 69.

The stand 69 includes a slider part 691 and a stand body 693. The slider part 691 is a quadrangular flat plate member and is slidably attached to the rail part 67. The stand body 693 has a substantially L-shaped outer shape. The stand body 693 is attached to the slider part 691 in such an orientation that the proximal portion is parallel to the floor surface and the distal portion is perpendicular to the floor surface. The proximal side surface of the stand body 693 is attached to the slider part 691.

The cable carrier 71 is arranged above the rail base 63 so as to vertically straddle the stand body 793 and the slider part 691. One end portion 71a of the cable carrier 71 is fixed to the stand body 793 via a bracket 77. The other end portion 71c of the cable carrier 71 is fixed to a support plate 73 arranged below the pair of rails 671. The other end portion 71c of the cable carrier 71 is fixed at a position near the length center of the robot traveling device 60 (rail part 67) between the pair of rails 671.

In the robot traveling device 60 according to the third embodiment, the rail base 63 is placed horizontally; therefore, dust, chips, dirt, and the like are more likely to accumulate in the rail part 67 than in the robot traveling devices 20 and 40 according to the first and second embodiments in which the rail bases 23 and 43 are placed vertically, and more frequent maintenance may be required accordingly. Further, at the time of maintenance such as rail replacement, the robot traveling device 60 needs to be pulled out from the space in the lower portion of the front surface of the machine tool 100, which may lower the workability of maintenance work. However, since the installation height can be kept low by placing the rail base 63 horizontally, the robot traveling device 60 can be arranged in a place having a deep depth but a low height. Other than the above, the same effects as those of the robot traveling devices 20 and 40 according to the first and second embodiments can be achieved.

Fourth Embodiment

Figure 16:
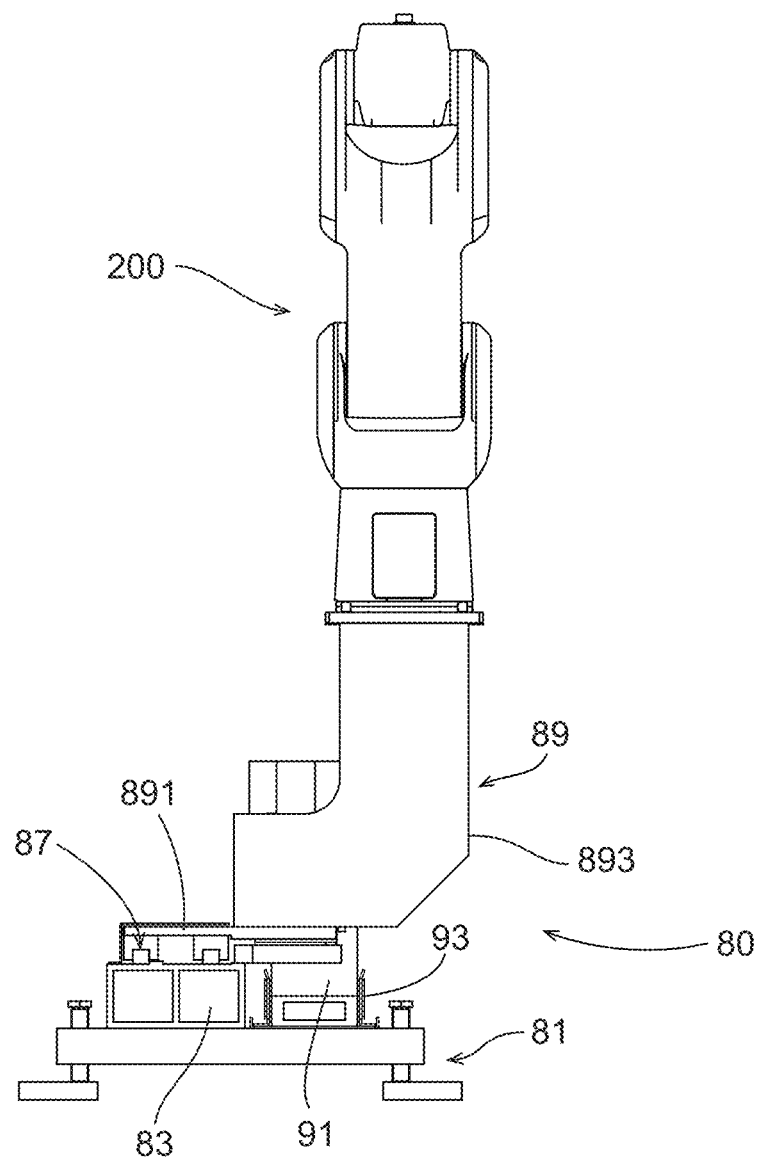
FIG. 16 is a side view showing a robot traveling device according to a fourth embodiment.
Figure 17:
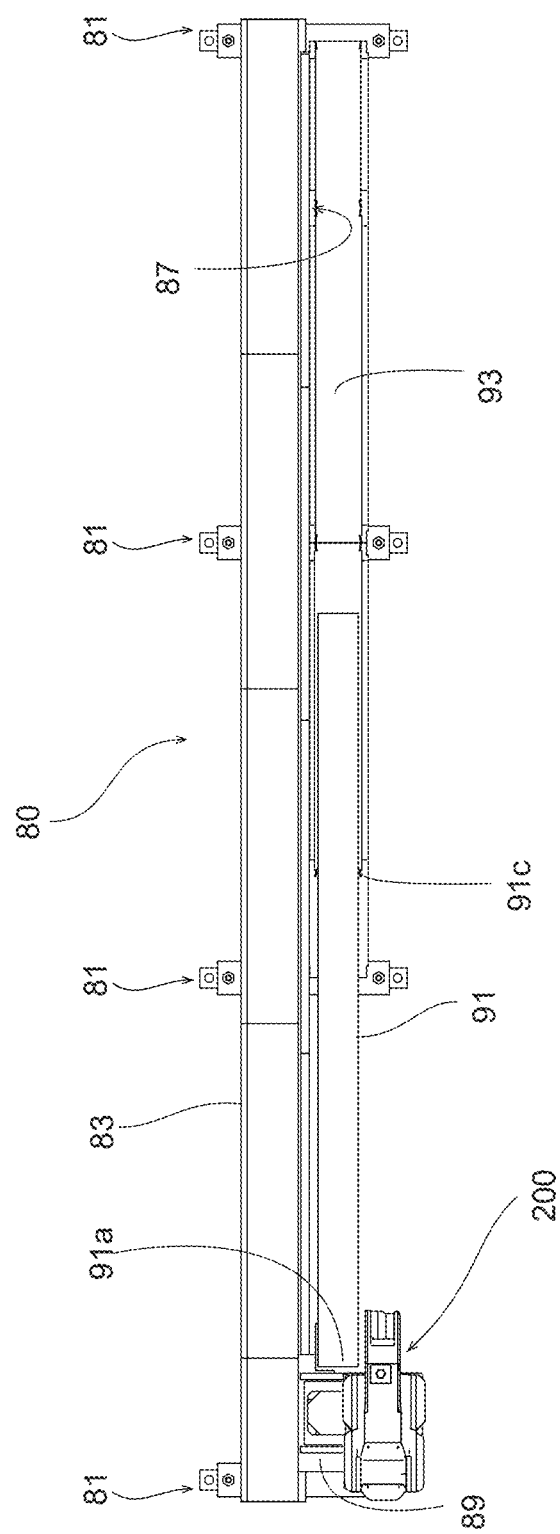
FIG. 17 is a plan view of the robot traveling device of FIG. 16.
Figure 18:
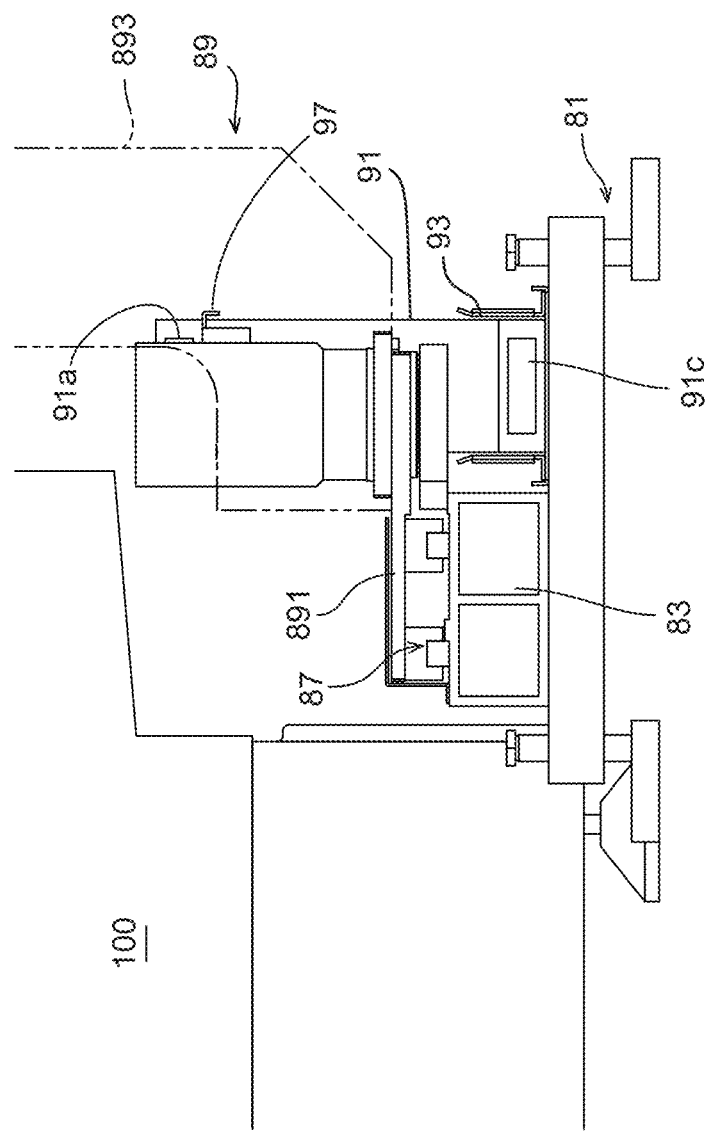
FIG. 18 is an enlarged view of a portion of the robot traveling device of FIG. 16 which is placed on the floor surface.

In the robot traveling device 20 according to the third embodiment, the cable carrier 71 is installed above the rail base 63; however, the position where the cable carrier 71 is installed is not limited to this. In a robot traveling device 80 according to the fourth embodiment, the cable carrier 71 arranged above the rail base 63 in the robot traveling device 60 according to the third embodiment is arranged adjacent to the rail base 63. The robot traveling device 80 according to the fourth embodiment will be described below with reference to FIGS. 16, 17, and 18.

The robot traveling device 80 includes a plurality of bases 81. A rectangular long plate-shaped rail base 83 is placed horizontally on the plurality of bases 81 with respect to the floor surface. The rail part 87 is supported by the rail base 83. A stand 89 is movably supported by the rail part 87. The robot 200 is mounted on the stand 89.

The stand 89 includes a slider part 891 and a stand body 893. The slider part 891 is a quadrangular flat plate member and is slidably attached to the rail part 87. The stand body 893 has a substantially L-shaped outer shape. The stand body 893 is attached to the slider part 891 in such an orientation that the proximal portion is parallel to the floor surface and the distal portion is perpendicular to the floor surface.

The cable carrier 91 is arranged at a position adjacent to the rail base 83 so as to vertically straddle the proximal portion of the stand body 893. One end portion 91a of the cable carrier 91 is fixed to the stand body 893 via a bracket 97. The end portion 91a of the cable carrier 91 is fixed at a position slightly above the proximal portion of the stand body 893. The other end portion 91c of the cable carrier 91 is fixed to a support plate 93 laterally laid across the upper surfaces of the bases 81. The other end portion 91c of the cable carrier 91 is fixed at a position near the length center of the robot traveling device 80 (rail part 87).

In the robot traveling device 80 according to the fourth embodiment, the cable carrier 91 is arranged between the rail part 87 and the robot 200; therefore, the amount of dust from the machine tool 100 that accumulates in the rail part 87 can be reduced in comparison with the robot traveling device 60 according to the third embodiment in which the cable carrier 91 is arranged above the rail part 87, and the installation height can be further reduced although the installation width increases. Therefore, the robot traveling device 80 can be arranged in a place having a deep depth but a low height. Other than the above, the same effects as those of the robot traveling device 60 according to the third embodiment can be achieved.

While some embodiments of the present invention have been described, these embodiments have been presented as examples, and are not intended to limit the scope of the invention. These embodiments can be implemented in various other forms, and various omissions, replacements, and changes can be made without departing from the spirit of the invention. These embodiments and their modifications are included in the scope and spirit of the invention and are included in the scope of the claimed inventions and their equivalents.

EXPLANATION OF REFERENCE NUMERALS

10: robot system, 20: robot traveling device, 100: machine tool, 101: machine tool base, 103: machine tool body, 105: table, 107: main shaft, 109: slide door

The invention claimed is:

1. A robot traveling device arranged on a floor surface, the robot traveling device comprising:
   a plurality of bases discretely installed along a first direction on the floor surface;
   a rail base installed along the first direction on the bases;
   a rail part supported by the rail base;
   a stand part that is movably supported by the rail part and on which a robot is mounted; and
   a flexible cable carrier for protecting a cable of the robot, wherein:
   heights of the bases are determined so that a gap of 50 to 100 mm is provided between the floor surface and the rail base and so that a gap of 50 to 100 mm is provided between the floor surface and the flexible cable carrier; and
   wherein:
   in order to offset a travel axis on which the robot travels in a second direction parallel to the floor surface and perpendicular to the first direction with respect to a central axis of the rail part;
   the stand part has an outer shape has an L-shaped vertical cross section, a proximal portion of the stand part connected to the rail part extends parallel to the second direction, and a distal portion of the stand part connected to the robot extends perpendicular to the floor surface.

2. The robot traveling device according to claim 1, wherein
   the rail part includes a pair of rails, and
   the pair of rails are arranged side by side along a direction horizontal to the floor surface.

3. The robot traveling device according to claim 2, wherein the cable carrier is arranged above the rail base.

* * * * *